Sept. 3, 1957   J. B. HIRSCHMANN   2,804,623
GOGGLES
Filed Oct. 31, 1955
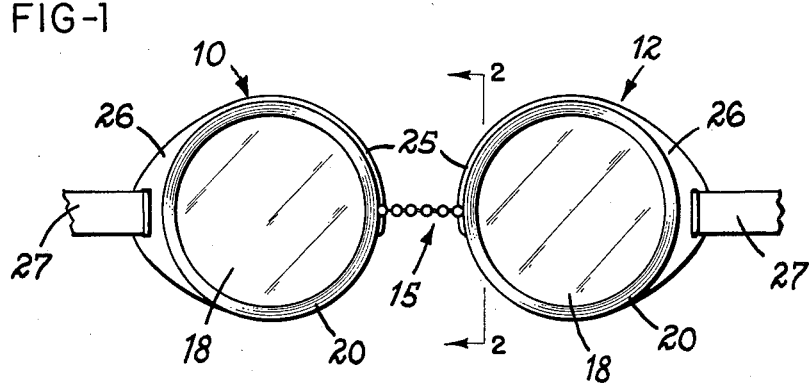
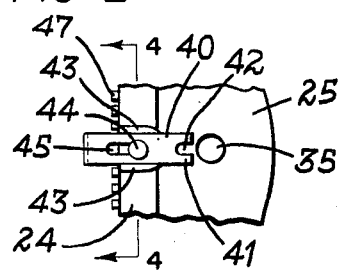
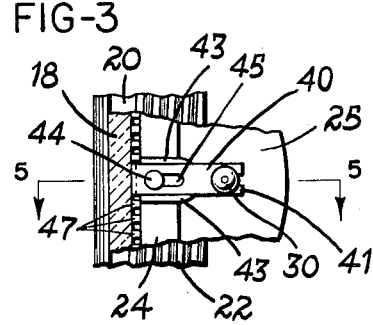
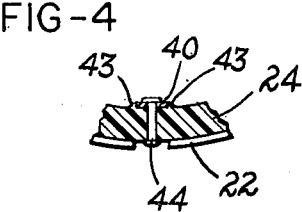
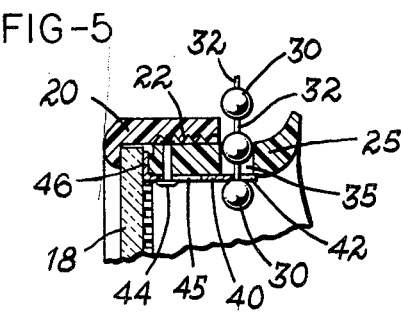
INVENTOR.
JACK B. HIRSCHMANN
BY
Marechal, Biebel, French & Bugg
ATTORNEYS

United States Patent Office 2,804,623
Patented Sept. 3, 1957

2,804,623

GOGGLES

Jack Bouton Hirschmann, Fairhaven, Mass.

Application October 31, 1955, Serial No. 543,650

1 Claim. (Cl. 2—14)

This invention relates to eye protecting goggles such as welding goggles, and particularly to goggles having separate eye cups joined by a flexible bridge connection.

In many industrial occupations it is necessary or advisable for workers to wear protective goggles to shield the eyes of the wearer from harmful light, flying particles, and so forth. One type of protective goggle which is used in substantial quantities, particularly as welding goggles, comprises a pair of eye cups each having a face contacting edge which is contoured to fit about the eyes, contacting the face of the wearer along continuous lines extending generally along the eyebrow, along the lower temple, across the upper front cheek, and thence along the side and bridge of the nose to the eyebrow line. The outer edge of each eye cup is generally circular, arranged to extend approximately at right angles to the line of sight, and contains a lens held in place across the outer edge by a retaining ring. This lens may be either clear or colored, depending upon the protective effect desired.

The eye cups are usually connected by a flexible bridge piece adapted to extend across the bridge of the nose, and are firmly held in place upon the face of the worker by a band extending around the back of the head and connected to the temple engaging portions of the eye cups.

In order to make such goggles in large quantities, it is desirable to provide eye cups of standard dimensions, and therefore the only adjustment available to the worker when he is securing the goggles in place is the variance of the length of the head band. Due to the marked difference in facial characteristics, measurements, and the like, of different persons, such an adjustment may be impracticable, since although the band does draw the eye cups tightly against the face, the standard bridge connection may be too wide, and the eye cups are drawn rearwardly on the face toward the temples with consequent misalignment of the goggles, particularly the outer edges and lenses thereof.

Accordingly, it is a primary object of the present invention to provide a goggle of the separate eye cup type having an adjustable bridge connection of simple construction between the eye cups to provide for regulation of the distance between the eye cups on the face of the wearer.

Another object of this invention is to provide such a goggle wherein the adjustable bridge connection is securely locked with respect to the eye cups to prevent accidental disconnection of the eye cups and consequent falling off of the goggle.

Other objects and advantages of the invention will be apparent from the following description, the accompanying drawing and the appended claim.

In the drawing—

Fig. 1 is a front elevation view of a goggle provided in accordance with the invention.

Fig. 2 is a partial enlarged section taken along line 2—2 of Fig. 1, with the lens and retaining ring removed;

Fig. 3 is an enlarged partial section similar to Fig. 2 showing the adjustable bridge connection in locked position and the lens and retaining ring in place;

Fig. 4 is a section along line 4—4 of Fig. 2; and

Fig. 5 is a section along line 5—5 of Fig. 3.

Referring to the drawing, which illustrates a preferred embodiment of the present invention, the goggles are shown as including separate eye cups 10 and 12 joined by a bridge connection indicated generally at 15. Each eye cup is provided with a suitable lens 18 which may be either clear or colored. For example, in the case of welding goggles a dark colored lens is used, and when the goggles are to be worn around abrasive operations, as around a grinding wheel, clear glass lenses may be provided. The lenses are held in place by retaining rings 20 having a threaded connection 22 (Figs. 3 and 5) with the outer or forward edges 24 of the eye cup.

Each eye cup has a contoured face contacting rear edge including an inner portion 25 shaped to engage the side of the nose of the wearer, and an outer portion 26 extending rearwardly to overlie the lower temple of the wearer. Attached to the portions 26 are the opposite ends of a suitable head band 27 which is placed about the head of the wearer and holds the eye cups in place.

In accordance with the invention the bridge connection 15 includes a ball chain comprising a number of ball members 30 joined by thin wire links 32 to provide a flexible chain having alternatively wide and narrow sections. At least one of the eye cups is provided with means for engaging the chain between any two adjacent ball members 30 and clamping the chain with respect to the eye cup to provide a fixed, locked connection. Such a connection is illustrated on the eye cup 12, but it is understood, of course, that while both of the eye cups could be similarly equipped, an adjustable connection is required only at one end of the chain, and the other end may be connected to its associated eye cup in any suitable way preventing its withdrawal therefrom.

Referring to Fig. 2, an aperture 35 is provided through the inner nose-engaging portion of the eye cup, the size of this aperture being such that ball members 30 will just fit through the aperture, as shown in Fig. 5. A clip 40 having a bifurcated inner end 41 is mounted for sliding movement transversely of the inner cup portion 25, to provide for movement of the slot 42 in bifurcated end 41 from a position overlying aperture 35 to a position at one side thereof. Clip 40 is guided for sliding movement by parallel ridges 43, preferably molded integrally with the eye cup, and is retained between these ridges by a rivet 44 extending through an elongated slot 45 in the body of the clip. The outer end of the clip 40 is turned at right angles to the remainder of the clip to provide a retaining portion 46 (Fig. 5) which is adapted to rest between the lens engaging projections 47 on the front face of the eye cup when the connection is locked to hold the chain with respect to the eye cup.

Referring to Fig. 5, the chain 15 extends through aperture 35, and with the bifurcated end 41 of the clip extending across the inner end of aperture 35, a reduced passage is provided through the aperture which is smaller than the cross-section of ball members 30, but through which the links 32 may pass. The clip 40 is locked in this position by placing the lens 18 against the lens engaging projections 47 thus holding the retaining portion 46 of the clip against the front edge of the eye cup, so that when the retaining ring 20 is threaded into place, the clip is held in this position, and the bridge connecting chain is fixed with respect to the eye cup.

Thus, in accordance with the invention, if the bridge connection 15 is too wide or too narrow for a worker using the goggles, this connection may be adjusted to the proper width by removing the retaining ring 20 and lens 18, pulling the clip 40 to its open position as in Fig. 2, moving the chain transversely of aperture 35 until the correct length of chain extends between the eye cups 10 and 12, and then clamping the chain with respect to the eye cup by pushing clip 40 back into its locked position and replacing the lens and retaining ring.

The present invention thereby provides an adjustable bridge connection for a goggle which is simple and inexpensive to manufacture, which positively retains the eye cups within a range of fixed distances from each other when placed on the face of the wearer, and which clamps the bridge connecting chain with respect to the eye cup in such a way that any accidental separation of the eye cups is practically eliminated.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

In a goggle, a generally cylindrical eye cup having a face protecting edge contoured to fit the facial areas about the eye and having a nose engaging portion, lens engaging projections extending from the front edge of said eye cup, a lens seated against said lens engaging projections, a retaining ring clamping said lens onto said lens engaging projections, said nose engaging portion of said eye cup having an aperture therethrough, a chain having alternate wide and narrow sections, said wide sections of said chain being receivable through said aperture in relatively close fitting relation with the walls of said aperture, a clip having a bifurcated end defining a slot of a width intermediate the width of said wide and narrow chain portions, said eye cup including means defining a slot in the interior surface of said nose engaging portions extending axially thereof from the front edge of said cup rearwardly toward and aligned with said aperture, means securing said clip within said slot for sliding movement of said bifurcated end across said aperture to reduce the cross-section of the passage through said aperture, and a retaining portion on the other end of said clip adapted to be received between said lens engaging projections of said eye cup and to be held in such position by said lens to retain said clip in the position wherein said slot extends across said aperture.

References Cited in the file of this patent

UNITED STATES PATENTS

| | | |
|---|---|---|
| 2,007,431 | Malcom | July 9, 1935 |
| 2,580,605 | Schauweker | Jan. 1, 1952 |